(12) United States Patent
Henegar

(10) Patent No.: US 6,973,951 B2
(45) Date of Patent: Dec. 13, 2005

(54) OBSTRUCTION AVOIDANCE CONTINUOUS SEAM WELDING SYSTEM

(75) Inventor: Jeffrey W. Henegar, Westfield, IN (US)

(73) Assignee: BFS Diversified Products, LLC, Indianapolis, IN (US)

( * ) Notice: Subject to any disclaimer, the term of this patent is extended or adjusted under 35 U.S.C. 154(b) by 0 days.

(21) Appl. No.: 10/435,640

(22) Filed: May 9, 2003

(65) Prior Publication Data

US 2004/0011459 A1 Jan. 22, 2004

Related U.S. Application Data

(60) Provisional application No. 60/380,500, filed on May 13, 2002.

(51) Int. Cl.$^7$ ............................ B32B 31/20; B32B 35/00
(52) U.S. Cl. ........................ 156/499; 156/502; 156/582; 156/583.3
(58) Field of Search ............................ 156/71, 91, 92, 156/304.1, 304.3, 308.2, 308.4, 583.3, 580–582, 502

(56) References Cited

U.S. PATENT DOCUMENTS

| | | |
|---|---|---|
| 4,087,309 A | 5/1978 | Lang ............................ 156/497 |
| 4,239,581 A | 12/1980 | Lang ............................ 156/82 |
| 4,440,588 A | 4/1984 | Stevenson et al. ........... 156/157 |
| 4,447,288 A | 5/1984 | Seaman ........................ 156/574 |
| D294,362 S | 2/1988 | Sinclair ........................ D15/144 |
| 4,737,212 A | 4/1988 | Emerich et al. ............. 156/157 |
| 4,737,213 A | 4/1988 | Paeglis et al. ............... 156/157 |
| 4,744,855 A | 5/1988 | Ellenberger et al. ........ 156/499 |
| 4,834,828 A | 5/1989 | Murphy ........................ 156/359 |
| 4,855,004 A | 8/1989 | Chitjian ........................ 156/359 |
| 4,861,400 A | 8/1989 | Sargent ........................ 156/71 |
| 4,861,412 A | 8/1989 | Meister ........................ 156/499 |
| 4,872,941 A | 10/1989 | Lippman et al. ............. 156/497 |
| 5,110,398 A | 5/1992 | Murphy ........................ 156/499 |
| 5,234,533 A | 8/1993 | Neal ............................ 156/497 |
| 5,353,782 A | 10/1994 | Morris ................. 126/271.2 R |
| 5,399,226 A | 3/1995 | Chapman ..................... 156/408 |
| 5,569,352 A | 10/1996 | Johansen et al. ............ 156/499 |
| 5,624,511 A | 4/1997 | Lippman ..................... 156/64 |
| 5,776,299 A | 7/1998 | Morris ......................... 156/497 |
| 5,816,019 A | 10/1998 | Saget et al. ................. 53/373.9 |
| 5,865,942 A | 2/1999 | Sinclair ....................... 156/499 |
| 5,935,357 A | 8/1999 | Hubbard et al. ............. 156/82 |
| 6,004,645 A | 12/1999 | Hubbard ...................... 428/57 |
| 6,050,317 A | 4/2000 | Weissfloch .................. 156/499 |
| 6,055,786 A | 5/2000 | Hubbard et al. ............. 52/409 |
| 6,149,762 A | 11/2000 | Kobzan ....................... 156/497 |
| 6,186,210 B1 | 2/2001 | Gehde ......................... 156/499 |
| 6,187,122 B1 | 2/2001 | Hubbard et al. ............. 156/82 |
| 6,213,184 B1 | 4/2001 | Sinclair ....................... 156/499 |
| 6,238,502 B1 | 5/2001 | Hubbard ...................... 156/71 |
| 6,325,126 B1 | 12/2001 | Rubenacker et al. ........ 156/497 |
| 6,533,014 B1 | 3/2003 | Rubenacker et al. |
| 6,536,498 B1 * | 3/2003 | Srinivasan et al. ......... 156/497 |
| 6,537,402 B2 | 3/2003 | Pate et al. |
| 6,554,947 B2 | 4/2003 | Pfotenhauer et al. |
| 6,581,663 B2 | 6/2003 | Rubenacker et al. |
| 6,584,296 B1 * | 6/2003 | Swift .......................... 399/313 |
| 6,615,892 B2 | 9/2003 | Hubbard et al. |
| 2001/0003625 A1 | 6/2001 | Apgar et al. |
| 2001/0027804 A1 | 10/2001 | Inoue et al. |
| 2003/0082870 A1 | 5/2003 | Srinivasan et al. |
| 2003/0126816 A1 | 7/2003 | Hasan et al. |

* cited by examiner

Primary Examiner—Chris Fiorilla
Assistant Examiner—Sing P. Chan
(74) Attorney, Agent, or Firm—Arthur M. Reginelli; Michael R. Huber

(57) ABSTRACT

An apparatus for seaming roofing membranes to one another, wherein one of the membranes is secured to an underlying support structure by at least one protruding fastener is provided. The apparatus includes a wheeled carriage having an upwardly extending push/pull bar. A power supply propels the wheeled carriage and energizes a heating assembly that generates a heated airflow sufficient to fuse the roofing membranes to one another. A nozzle is coupled to the heating assembly for directing the heated airflow between the two membranes. A variable pressure roller assembly is coupled to the carriage and has a single durometer material carried by an axle that may have different diameter sections. The roller passes over the at least one protruding fastener while still applying a uniform pressure so as to form a substantially continuous width seam except where interrupted by the protruding fastener.

8 Claims, 4 Drawing Sheets

OBSTRUCTION AVOIDANCE CONTINUOUS SEAM WELDING SYSTEM

This application claims the benefit of U.S. Provisional Application No. 60/380,500, filed May 13, 2002.

FIELD OF THE INVENTION

This invention relates generally to roof membrane seam welders. More particularly, it relates to a seam welder that accommodates fastening obstructions and provides a continuous seam weld when obstructions are not present.

BACKGROUND OF THE INVENTION

When installing a roof, roof membranes are applied over the base structure. Roof membranes, which are made of polymeric materials such as ethylene propylene diene monomer (EPDM), repel water, snow, and generally protect the integrity of the underlying structure.

To properly install roof membranes, a fastening device such as a plate, batten bar, or other type of mechanical affixment secures one edge of a membrane to the underlying structure. An edge of a second membrane is then placed over the first membrane and the fastening device. The membranes are then welded to one another by applying a solvent/adhesive and/or by applying heat. The welding process is complicated by the presence of the fastener along the edge of the bottom membrane. As such, it is difficult to obtain a uniform and continuous seam/weld between the adjoining membranes.

One attempt at avoiding obstructions and fasteners is disclosed in U.S. Pat. No. 4,834,828, in which a bifurcated heat element seams the membranes while avoiding the fastening device. Although effective, the disclosed seaming device is deficient inasmuch as some fastening devices do not extend along the entire edge of the membrane and a gap or bubble may form along the welded seam. Accordingly, a secure seal is not obtained by virtue of elements infecting the gap between the seams and allows the membranes to be subjected to uplift pressures and other natural elements. This deteriorates the integrity of the seam which ultimately damages the underlying structure.

A continuous welding machine that can accommodate fastening devices when encountered and provide a continuous weld when obstructions are not present remains an unmet need in the art.

SUMMARY OF THE INVENTION

Briefly, the present invention provides an apparatus for seam welding membranes that avoid obstructions when encountered and also provides a continuous width weld when obstructions are not present.

In an apparatus for seam welding membranes that avoids obstructions, there is a wheeled carriage, which may be driven by a motor, that is typically pulled during operation. The apparatus heats both membranes in the area where they are to be seamed to one another. Once a fusing temperature has been reached, a weighted roller assembly applies pressure to the membranes to complete the bonding process.

In order to obtain a continuous seam weld when obstructions are not present and to avoid obstructions when encountered, a specially designed nozzle and roller assembly are used. A heating assembly is mounted on the carriage and exhausts heated air between the two membranes. The heating assembly includes a nozzle which is in close association with the bottom and top membranes. The nozzle is configured to provide an optimal heat gradient for bonding the membranes. The carriage moves at a relatively low rate of speed so that the heated air can elevate the surface temperature of the membranes to about their melting temperature. Immediately following the nozzle, a roller assembly exerts a uniform pressure upon the two membranes to ensure their bonding to one another. In order to avoid obstructions, the pressure roller assembly incorporates a roller having a deflectable outer surface. In particular, the roller assembly includes a roller with an outer surface with a hardness of less than 5 and preferably about 3 to about 5 on a Shore A scale and which continually exerts a pressure force upon the heated membranes. The pressure roller is carried by an axle which has a center section with a small diameter and opposed outer sections with a relatively larger outer diameter so that the roller exerts a relatively uniform pressure upon the membranes in the absence of an obstruction. When an obstruction is encountered, the center section of the roller assembly is allowed to deflect more than the outer sections and then the roller returns to a normal position after the obstruction has passed. Accordingly, a substantially continuous width seam is formed between the membranes except where interrupted by a protruding fastener.

The present invention provides an improved method for fusing two membranes to one another while also improving the integrity of the seam therebetween.

BRIEF DESCRIPTION OF THE DRAWINGS

For a more complete understanding of the invention, reference can be made to the following detailed description and accompanying drawings.

DETAILED DESCRIPTION OF ILLUSTRATIVE EMBODIMENTS

Figure 1:
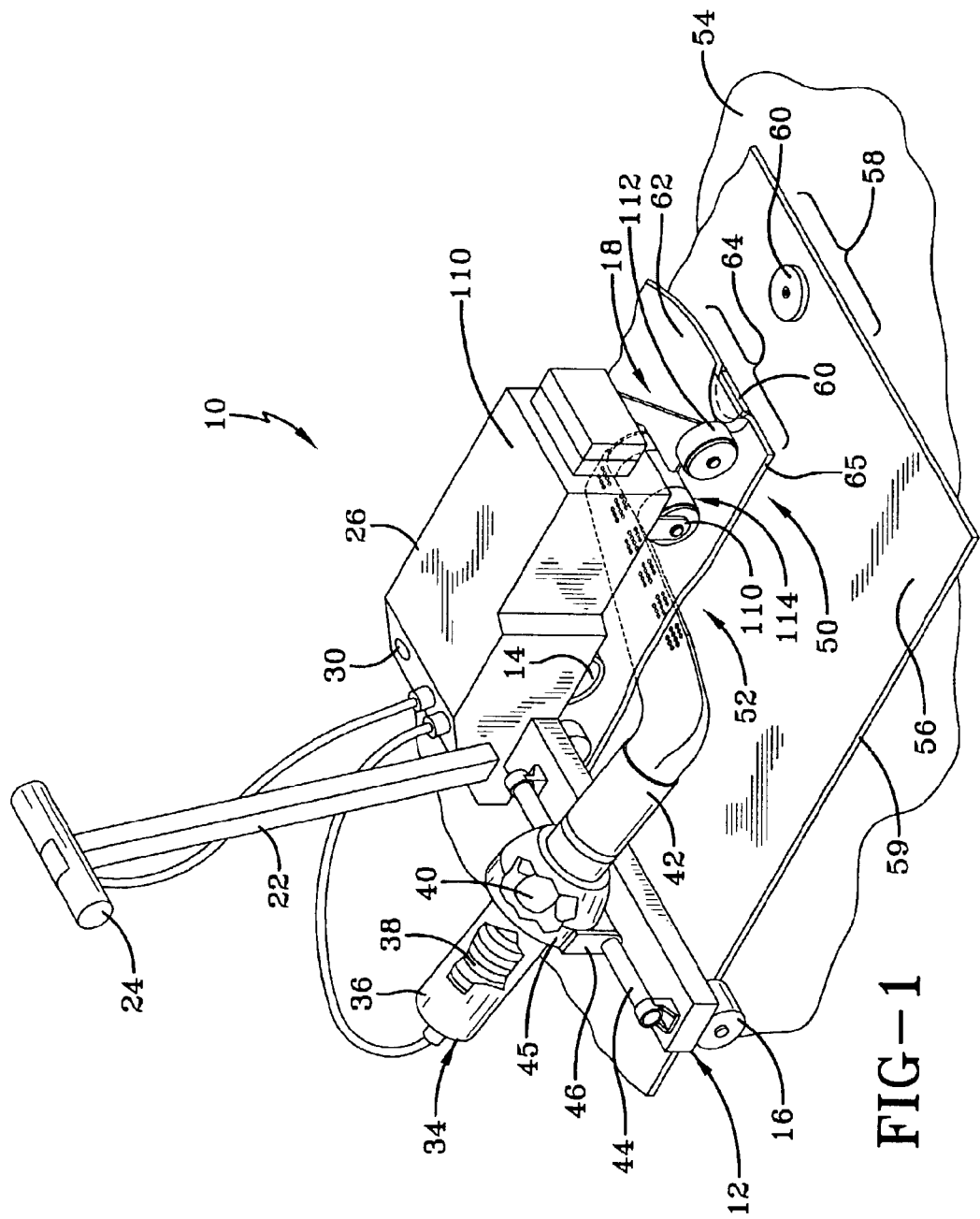
FIG. 1 is a schematic perspective illustration of a continuous seam welder according to the present invention.

Referring now to FIG. 1, an apparatus for an obstruction avoidance continuous seam welding system is designated generally by the numeral 10. The apparatus 10 includes a carriage 12 which is supported and moveable upon a drive wheel assembly 14. Typically, the drive wheel assembly is located on the side of the carriage 12 in the direction in which the carriage is intended to move. Other wheels 16 may be positioned upon the carriage to rotatably support it during operation. Positioned at the other end of the carriage 12 is a pressure roller assembly designated generally by the numeral 18. The pressure roller assembly facilitates movement of the carriage and its full function will be described in detail hereinbelow. A shaft 22 is fixedly mounted to the carriage 12 and extends upwardly therefrom. A cross-bar 24 extends perpendicularly from the shaft 22 and may be employed by an operator to push or pull the carriage.

The carriage 12 carries a power supply 26 which may be an electric motor or the like for providing power to the apparatus 10. It will be appreciated that the power supply may be battery-powered or it may be a device that receives electrical power from a generator or utility service. The power supply 26 is used to power the drive wheel assembly 14 which propels the carriage 12. A plurality of controls 30 are carried by the carriage 12 and associated with the power supply 26 to regulate the power generated thereby. The controls 30 function to adjust the power and support other features of the apparatus 10.

The heating assembly 34, which is associated with the power supply 26 and the controls 30, is supported by the carriage 12. The heating assembly includes a housing 36 in which heat elements 38 are contained. A fan 40 is carried in the housing 36 and, when energized, forces ambient air across or through the heat elements 38 in a manner well known in the art. The heated ambient air is then directed through a heat duct 42. A lateral pin 44 is mounted to the carriage 12 and carries the heating assembly 34. In particular, the assembly 34 is received in a mounting collar 45 from which extends a pair of arms 46 that slide and pivot upon the pin 44. This allows the assembly to be easily inserted and withdrawn from a position to seam the membranes to one another.

Figure 2:
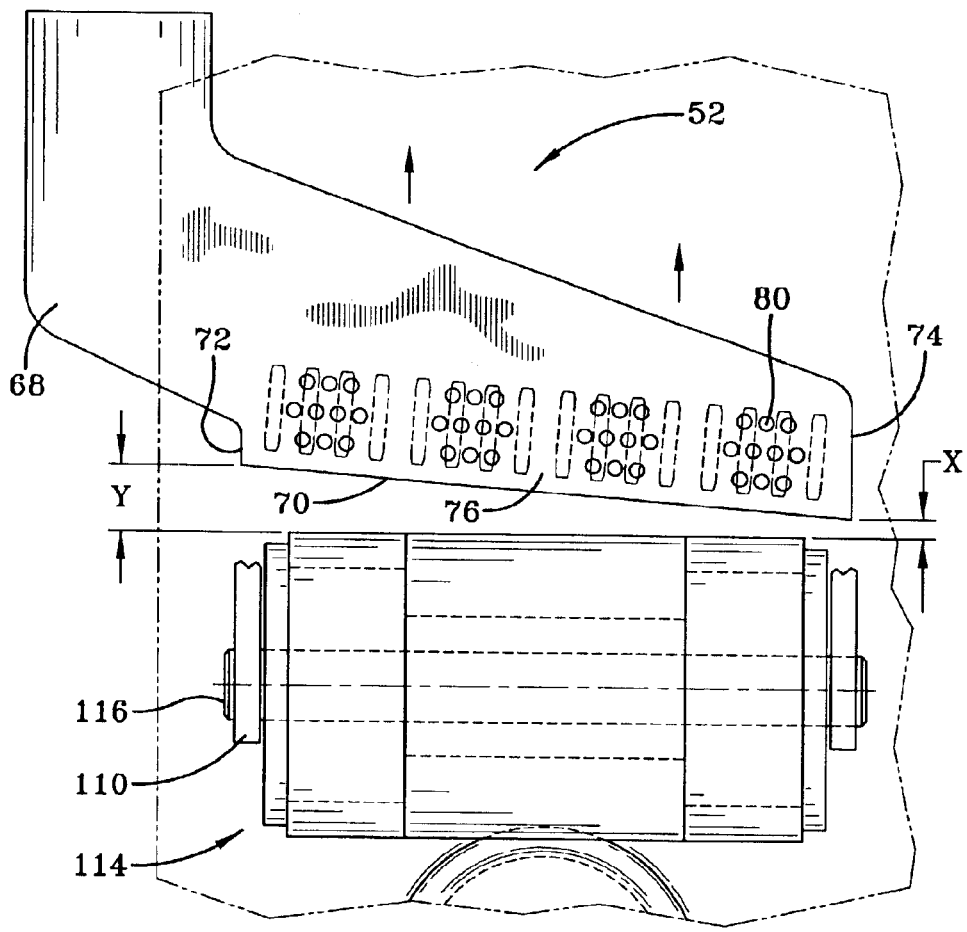
FIG. 2 is a plan view of a pressure roller assembly and associated nozzle.

It can be seen that a seaming assembly, designated generally by the numeral 50, is carried by the carriage 12. The seaming assembly includes the roller assembly 18 and a nozzle 52. As best seen in FIG. 2, the nozzle 52 directs heated air from the heat duct 42 to the surfaces of the membranes that are to be joined together. The membranes are supported by an underlying support structure 54. In practice, a bottom membrane 56 is placed over the support structure 54 and may be at least temporarily held in place by an adhesive or the like. The bottom membrane 56 includes an edge 58 that is to be seamed. The edge 58, as defined herein, may include an area somewhat removed from the literal edge of the membrane 56. In order to positively secure the bottom membrane 56 to the support structure 54, a fastener 60 is employed. The fastener 60 may be a round disc with a screw therethrough, a batten bar, or other fastening device which has a protruding member extending above the surface of the bottom membrane 56. Disposed over the bottom membrane 56 is a top membrane 62 which has an edge 64. The edge 64 may be an area which is somewhat removed from the literal edge of the top membrane 62.

Figure 3:
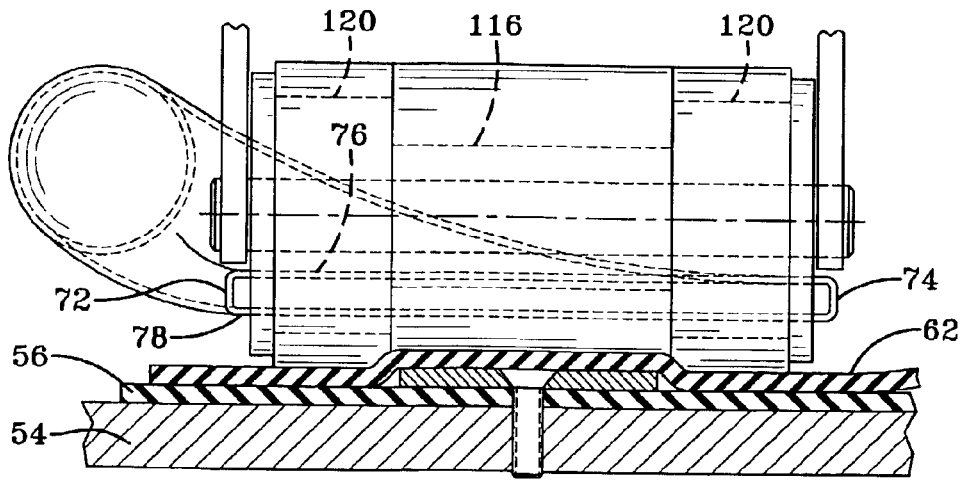
FIG. 3 is an elevational view of the pressure roller assembly.

As seen in FIGS. 1–3, the nozzle 52 directs the heated air between the top surface of the bottom membrane 56 and the underlying surface of the top membrane 62. The nozzle 52 includes an elbow 68 which redirects the flow of heated air from the heat duct 42 in such a way that the heat is applied to the desired surfaces without dislodging the membrane's positioning upon the underlying structure. The nozzle 52 may be provided with an end section 70 that is either open or closed. The nozzle has a proximal edge 72 on one side of the end 70 and a distal edge 74 on the other side of the end 70. The edges 72 and 74 are connected by a top plate 76 and a bottom plate 78. A plurality of vent holes 80 may be provided through the top plate 76 and the bottom plate 78 to facilitate the distribution of heat between the two membranes.

The positioning of the nozzle 52 with respect to the pressure roller 18 is important to the overall operation of the apparatus 10. The end of the distal edge 74 is positioned so as to be closer to the pressure roller 18 than the end of the proximal edge 72. In the preferred embodiment, the end of the proximal edge 72 is positioned approximately 2 inches from the roller, whereas the distal edge 74 is positioned approximately about ⅛ inch from the pressure roller. Although the positioning of the nozzle edges with respect to the pressure roller can be varied, it is believed that these dimensions provide the most efficient heat gradient for bonding the membranes to one another in conjunction with the use of the pressure roller.

The pressure roller assembly 18, which is part of the seaming assembly 50, is carried by the carriage 12 and, in particular, by a frame 110 attached to the carriage. The assembly 18 and the nozzle 52 may be attached to existing seam welders with slight modifications or may be part of an originally manufactured welder. The frame 110 carries a stabilization roller 112 which extends beyond the carriage 12 for the purpose of balancing the apparatus and keeping it properly aligned with respect to the membranes to be welded. Positioned somewhat behind the stabilization roller 112 is a drive/pressure roller 114. The pressure roller 114 is positioned underneath the carriage and functions to propel the apparatus in the appropriate direction.

Figure 4:
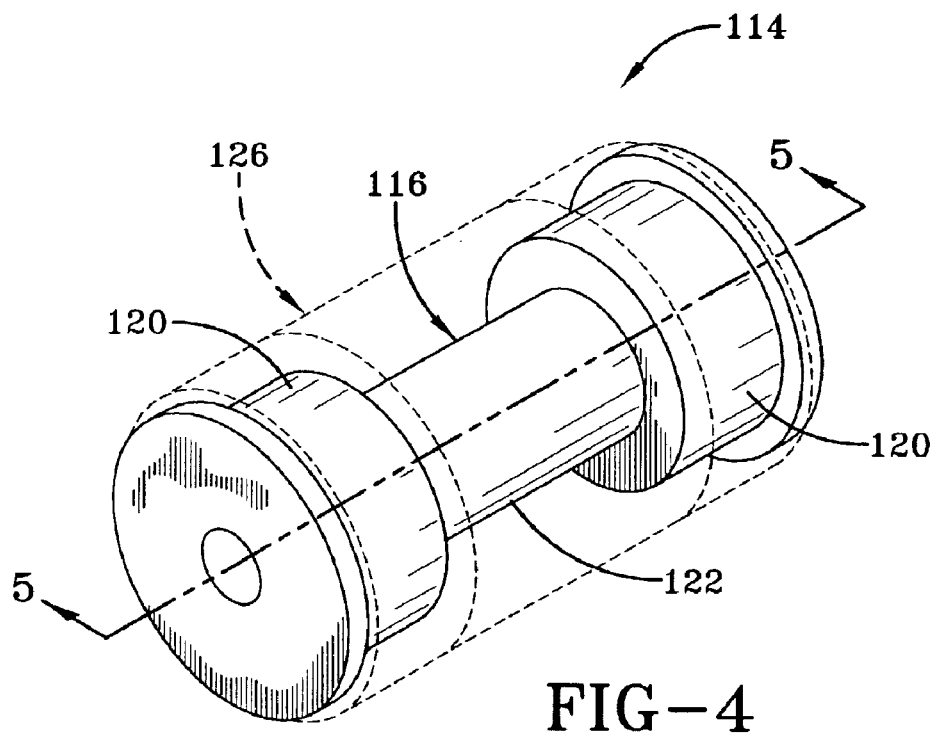
FIG. 4 is a perspective view of a pressure roller.

As best seen in FIGS. 2–4, the pressure roller 114 includes an axle 116 which is driven by the motor in a manner well known in the art. The axle 116 includes a pair of opposed outer sections 120 on either side of a smaller diameter center section 122. A deflectable outer surface 126 is disposed over the axle 116. The outer surface may be any flexible or foam-like material that has a hardness value of about 5 or less, or preferably about 5 to about 3 on the Shore A scale. This allows the roller material to deflect about ½ inch, although a larger deflection amount could be obtained if desired. In the preferred embodiment it is believed that a silicone material would work best with the other components of the apparatus 10 and the membranes, but other materials such as urethane or like foam material could be used. The deflectable outer surface 126 extends the entire length of the roller 114. Accordingly, the outer surface 126 has opposed outer sections 130 which are separated by a center section 132. Although the outer surface has three distinct sections, it will be appreciated that a single, properly shaped, silicone sleeve could be placed over the axle 116.

Figure 5:
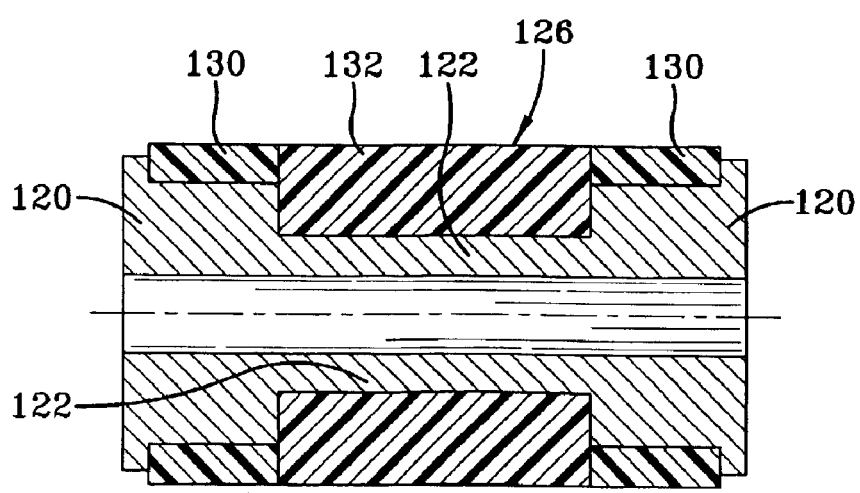
FIG. 5 is a sectional view of the pressure roller taken substantially along line 5—5 at FIG. 4.

In FIGS. 4–5 it can be seen that the three different sections of the deflectable outer surface 126 correspond to the outer and center sections of the axle. However, it is within the scope of this disclosure that a single uniform material with a single diameter axle could be employed.

Figure 6:
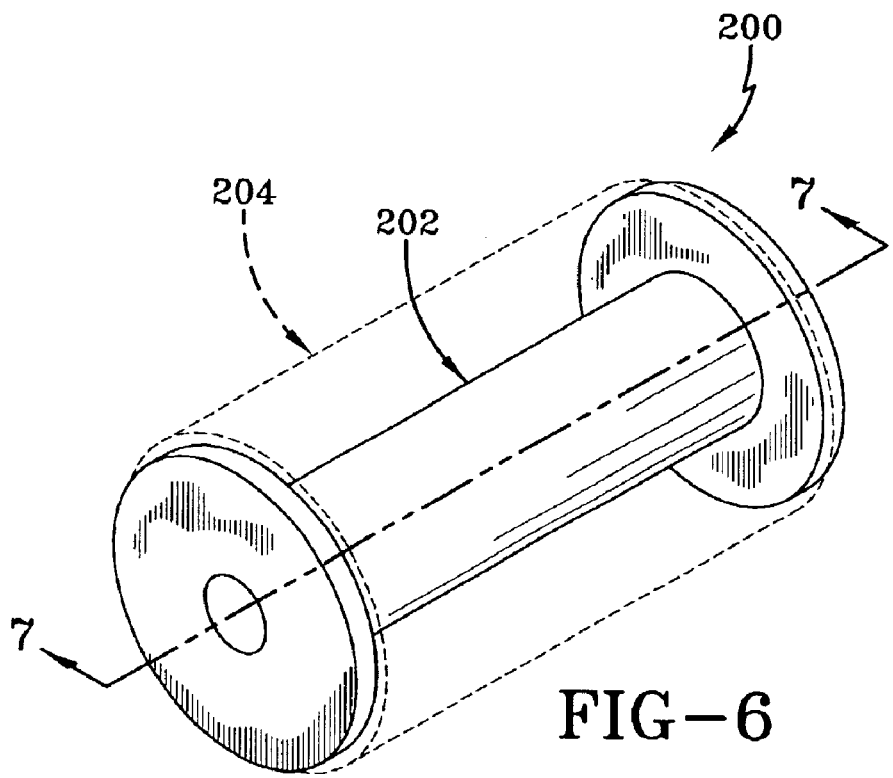
FIG. 6 is a perspective view of an alternative pressure roller.
Figure 7:
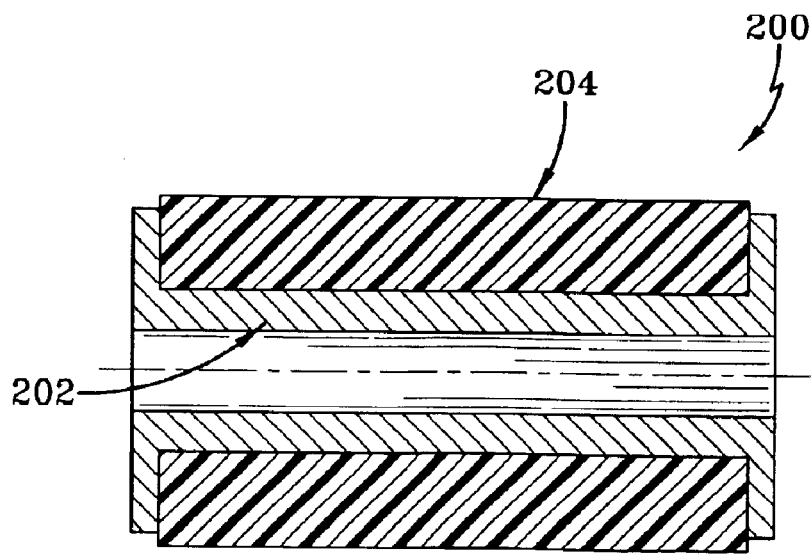
FIG. 7 is a sectional view of the alternative pressure roller taken substantially along line 7—7 at FIG. 6.

Indeed, in FIGS. 6 and 7 it can be seen that an alternative roller is designated generally by the numeral 200. The roller 200 includes an axle 202 which is driven by the motor. The axle 202 is a single diameter and has a single deflectable outer surface 204 disposed thereon. As in the previous embodiment, the outer surface 204 may be any flexible or foam-like material that has a hardness value of 5, or preferably about 5 to about 3 on the Shore A scale. Accordingly, the surface 204 deflects and conforms appropriately whenever an obstruction is encountered. The surface 204 then reforms to a substantially cylindrical shape when the roller no longer encounters the obstruction. The materials used for the roller 114 may also be used for the roller 200. In any event, as the apparatus 10 is moved, the pressure roller 114 or 200 may encounter a fastener such as shown in FIGS. 2 and 3. The deflectable outer surface material is flexible enough so as to accommodate the change in height of the membrane caused by the fasteners encountered so as to allow for an appropriate application of force across the width of the seam to be formed. Use of a deflectable outer surface 126 or 204 allows for variations in the positioning of the fasteners inasmuch as they may not be properly centered or aligned when placed to secure the bottom membrane. And, different sizes of fasteners may be encountered such that the pressure roller is easily adapted to conform to the shape encountered without the need to change wheels or the like. Since the obstructions to be encountered are likely to be centered along the length of the roller 114, it is believed that using a segmented axle with sections 120 and 122 allow for more of a pressure force to be applied at the edges of the seam when an obstruction is encountered and a sufficient sealing force along the width of the seam when an obstruction is not encountered.

In operation, when the carriage is moved either by manual force or by the motorized wheel assembly, heated air is directed through the nozzle to heat the surfaces of the membranes. The rate of speed of the carriage is controlled so that as the nozzle 52 passes over an obstruction, the membranes are heated to an appropriate bonding temperature. Immediately afterwards, the center section of the pressure roller 114 encounters the membrane elevated by the fastener, wherein the center section 132 and the outer sections 130 are deflected and conform to the profile of the top membrane and the protruding fastener the appropriate amount while still applying the appropriate pressure to the membranes on both sides of the fastener so that an effective bond is created therebetween. When a fastener is not encountered a continuous width seam is obtained. But when a fastener is encountered, both membranes are bonded around the outer periphery of the fastener. This device may be used when obstructions are not encountered at all, in instances where a protruding fastener runs along the entire length of the membrane or where a fastener is encountered in just selected portions along the edge of the membrane. By utilizing a single durometer outer surface it will be appreciated that various obstacles within the width of the seam can be encountered and avoided while still effectively providing a uniform width across the entire seam. Since it is believed that most obstructions will be in the center of the seam, the center section is allowed to deflect to a greater extent than the outer sections, but a single durometer material allows for a more uniform seam that completely surrounds the fastener.

The advantages of the foregoing embodiments are readily apparent. It will be appreciated that the fastening devices used to hold the bottom membrane are accommodated, but that a continuous width seam may be obtained where obstructions are not present. This ensures that bubbling or gaps between the membranes are avoided and, thus, the integrity of the seal is enhanced. Accordingly, the seaming assembly 50 includes a heat welding nozzle and roller assembly system for use in fusing seam areas containing mechanical fasteners and/or obstructions to create a continuous seal with either thermoplastic and/or thermoplastic vulcanite membranes. Accordingly, a wider continuous seam than any welding system commercially available for roofing applications is provided. The system is further advantageous inasmuch as it provides the ability to create a wider weld while providing enhanced performance of the roof system in the presence of uplift pressures, such as wind, freezing and thawing, and other natural environments. The center section of the pressure roller has the ability to move vertically overcoming obstructions without disrupting balance and/or the performance of the welding operation. Yet a further advantage of using a single deflectable outer surface is that a more complete bond can be obtained between the membranes than when a spring-biased center roller is used. Such a roller deflects as soon as a leading edge of the obstruction is encountered. Accordingly, if a circular obstruction is encountered, a square unbonded membrane area surrounding the obstruction will be provided. This may allow condensation between the unbonded areas of the membranes which may cause later deterioration of the seal between the membranes. In contrast, the deflectable outer surface only deflects when the obstruction is actually encountered. As a result, gaps between the membranes in the area around the obstruction are much less likely to be formed. It will be further appreciated that the configuration and positioning of the nozzle with respect to the pressure roller may be adjusted according to the particular fastening devices used or to obtain the width of the seam desired.

In order to demonstrate the practice of the present invention, the following examples have been prepared and tested. The examples should not, however, be viewed as limiting the scope of the invention. The claims will serve to define the invention.

What is claimed is:

1. A seam welder for roofing membranes, comprising:
    a pressure roller and a nozzle;
    wherein said roller has a deflectable outer surface made of single material;
    wherein a hardness of said single material comprises about 5 or less on a Shore A scale when measured by a durometer; and
    said nozzle has an end with a proximal edge and a distal edge, wherein said end is disposed in a position other than parallel with respect to said roller.

2. The seam welder of claim 1, wherein said roller comprises an axle that carries said deflectable outer surface, said axle comprising at least two sections of different diameter.

3. The seam welder of claim 2, wherein said axle comprises a central section having a first diameter and an outer section having a second diameter larger than said first diameter.

4. The seam welder of claim 3, wherein said central section is disposed between an outer section on either side thereof.

5. The seam welder of claim 4, wherein said deflectable outer surface is disposed over said central section and said outer sections.

6. The seam welder of claim 1, wherein said deflectable outer surface has a maximum deflection of about ½ inch.

7. The seam welder of claim 1, where said proximal edge is closer to said roller than said distal edge.

8. The seam welder of claim 1, wherein said material is arbitrarily deflectable along the entire length of said roller.

* * * * *